United States Patent [19]

Okamoto et al.

[11] Patent Number: 4,859,892

[45] Date of Patent: Aug. 22, 1989

[54] APPARATUS FOR SECURING MAGNETIC POLES OF MAGNET-TYPE ROTATING MACHINES

[75] Inventor: Kyoichi Okamoto; Hiroyuki Morikane; Shigeru Shiroyama, all of Hyogo, Japan

[73] Assignee: Mitsubishi Denki Kabushiki Kaisha, Tokyo, Japan

[21] Appl. No.: 159,281

[22] Filed: Feb. 23, 1988

[30] Foreign Application Priority Data

Feb. 23, 1987 [JP] Japan ................................ 62-25750

[51] Int. Cl.$^4$ ............................................ H02K 1/18

[52] U.S. Cl. .................................. 310/218; 29/522.1; 403/372

[58] Field of Search .............. 310/40 MM, 49 R, 154, 310/254, 218; 29/596, 522.1, 732; 267/158, 159, 164; 403/329, 326, 372, 405.1

[56] References Cited

U.S. PATENT DOCUMENTS 4,636,107 1/1987 Casler et al. ........................ 310/154

4,671,447 6/1987 Klink .................................. 267/158

FOREIGN PATENT DOCUMENTS 765193 6/1934 France ............................... 403/405

*Primary Examiner*—Patrick R. Salce

*Assistant Examiner*—Judson H. Jones

*Attorney, Agent, or Firm*—Wolf, Greenfield & Sacks

[57] ABSTRACT

An apparatus for securing magnetic poles of magnet-type rotating machines has a cylindrical fixed frame, a plurality of permanent magnets attached to the inner side of the fixed frame at a predetermined distance in the circumferential direction, and a positioning member defined by an elastic member having a substantially U-shaped cross section, the positioning member being disposed in the space between each pair of adjacent permanent magnets in such a manner as to abut against the opposing end faces of the pair of adjacent permanent magnets to thereby effect positioning of the permanent magnets in the circumferential direction. The positioning member is provided with bent portions which are formed near its open end, the bent portions extending inwardly of the positioning member. The bent portions of the positioning member prevent another positioning member from entering the inside of this positioning member, so that it is possible to prevent fitting engagement between stacked positioning members before they are assembled to the fixed frame.

7 Claims, 2 Drawing Sheets

APPARATUS FOR SECURING MAGNETIC POLES OF MAGNET-TYPE ROTATING MACHINES

BACKGROUND OF THE INVENTION

1. Field of the Invention

The present invention relates to an apparatus for securing magnetic poles of magnet-type rotating machines in which permanent magnets are used as field magnetic poles.

2. Description of the Prior Art

FIGS. 2 and 3 show in combination a conventional apparatus for securing magnetic poles of magnet-type rotating machines which is disclosed, for example, in Japanese Utility Model Public Disclosure No. 60-79231 (1985). In the Figures, the reference numeral 1 denotes a yoke which defines a cylindrical fixed frame. A plurality of permanent magnets 2 which serve as main poles are attached to the inner surface of the yoke 1 by means of positioning members 4 (described later). Auxiliary poles 3 which are formed of sort iron strip are firmly connected to the inner surface of the yoke 1 by electric resistance welding method or the like. Each of the auxiliary poles 3 is firmly attached to each of the magnets 2 at the side of increasing magnetic flux (magnetic flux for armature reaction) which is generated by a rotor (not shown). The numeral 4 denotes positioning members each defined by an elastic member formed into a substantial U-shape in cross section with its side walls 4*a* extending toward the open end. Each positioning member 4 is press-fitted into the space defined between one magnet 2 and the auxiliary pole 3 facing thereto, whereby the side walls 4*a* push the magnets 2 to bring them into close contact with the inner circumferential surface of the yoke 1. The pair of side walls 4*a* of each positioning member 4 are respectively provided with first and second pairs of notches, the distance between the first pair of notches corresponding to the axial length of the magnet 2, and the distance between the second pair of notches corresponding to the axial length of the auxiliary pole 3. Thus, when the positioning member 4 is press-fitted into the space between the magnet 2 and the auxiliary pole 3, the axially projecting portions 4*b* of the positioning member 4 project from the axial end faces of the magnet 2 and the auxiliary pole 3 and, at this time, the projecting portions 4*b* have a width larger than a clearance between the magnet 1 and the auxiliary pole 3, thus axially supporting the magnets 2.

The conventional magnetic pole securing apparatus arranged as described above suffers, however, from the following problems. Namely, before the positioning member 4 is press-fitted into the space between the magnet 2 and the auxiliary pole 3, it has a tub-like shape, i.e., a slightly outwardly opened U-shape in cross section, as shown in FIGS. 4 and 5. For this reason, before the positioning members 4 are assembled to the yoke 1, for example, during transportation, individuals in a stack of a plurality of positioning members 4 undesirably come into fitting engagement with each other as shown in FIG. 5, and therefore it is necessary to disengage them from each other at the time of assembling. Such fitting engagement between stacked positioning members 4 causes a particularly critical problem in the case of an automatic feed system employing a parts feeder or the like.

SUMMARY OF THE INVENTION

In view of the above-described problems of the prior art, it is a primary object of the present invention to provide an apparatus for securing magnetic poles of magnet-type rotating machines which is so designed that it is possible to prevent the undesirable fitting engagement between stacked positioning members before assembling and thus achieve excellent working efficiency.

To this end, the present invention provides an apparatus for securing magnetic poles of magnet-type rotating machines wherein each of the positioning members for positioning permanent magnets is provided with bent portions which are formed near its open end, the bent portions extending inwardly of the positioning member.

By virtue of the above-described arrangement, the bent portions that are provided near the open end of each positioning member prevent another positioning member from entering the inside of this positioning member, so that it is possible to prevent fitting engagement between stacked positioning members before assembling.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like members, and in which.

DESCRIPTION OF THE PREFERRED EMBODIMENT

The present invention will be described hereinunder in detail with reference to the accompanying drawings.

Figure 1A:
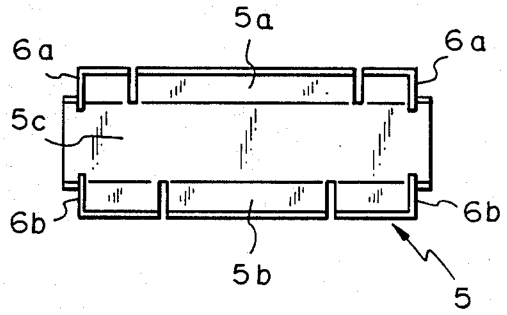
FIGS. 1(*a*) and 1(*b*) are plan and side views, respectively, of a positioning member used in one embodiment of the apparatus for securing magnetic poles of magnet-type rotating machines according to the present invention.
Figure 1B:
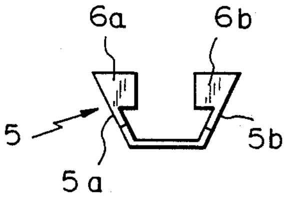
Figure 2:
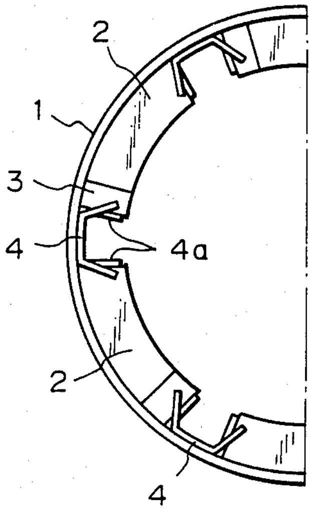
FIG. 2 shows the arrangement of a conventional apparatus for securing magnetic poles of magnet-type rotating machines.
Figure 3:
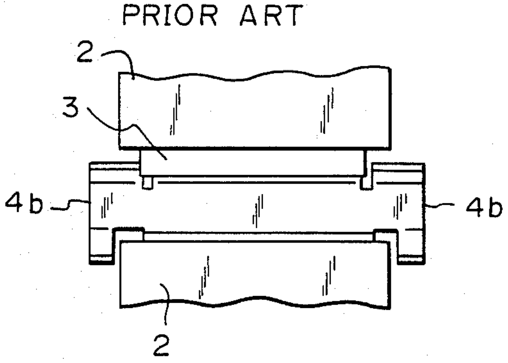
FIG. 3 shows the arrangement of an essential part of the prior art shown in FIG. 2.
Figure 4:
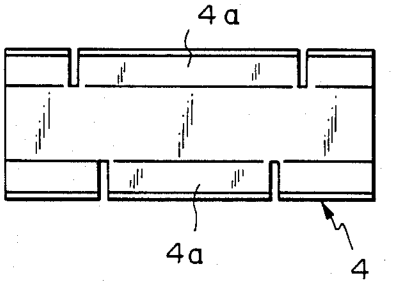
FIG. 4 is a plan view of a positioning member used in the prior art shown in FIG. 2.
Figure 5:
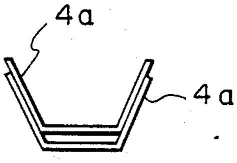
FIG. 5 is a side view showing two positioning members of a conventional type which are in fitting engagement with each other.

FIGS. 1(*a*) and 1(*b*) show a positioning member 5 used in one embodiment of the apparatus for securing magnetic poles of magnet-type rotating machines according to the present invention. The positioning member 5 is formed using an elastic material and has a substantially U-shaped cross-sectional configuration with its side walls 5*a*, 5*b* extending toward the open end in the same way as in the prior art. In this embodiment, however, the side walls 5*a* and 5*b* have respective bent portions 6*a* and 6*b* which are formed on the open end portions at both sides in the longitudinal (axial) direction of the positioning member 5, the bent portions 6*a* and 6*b* extending inwardly of the member 5. The bent portions 6*a* and 6*b* are positioned at the inner sides than the corresponding axial ends of the bottom portion 5*c* so that the axial distance between the bent portions 6*a* and 6a (6b and 6bp) is shorter than the axial length of the bottom portion 5c.

Thus, since the distance between the bent portions 6a and 6a (6b and 6b) is shorter than the axial length of the bottom portion 5c and the distance between the opposing bent portions 6a and 6b is also shorter than the width of the bottom portion 5c, the positioning member 5 can prevent another positioning member 5 from entering the inside of the former. Accordingly, even when a large number of positioning members 5 are stacked up, they are prevented from coming into fitting engagement with each other, and therefore it is unnecessary to conduct the operation of separating the engaged positioning members 5 before assembling, which operation has heretofore been needed.

It should be noted that, although in the above-described embodiment the bent portions 6a and 6b are formed at the ends of the side walls 5a and 5b, the positions of the bent portions 6a and 6b are not necessarily limitative thereto, and it is possible to form the bent portions 6a and 6b at other positions near the open end of the positioning member 5. With this alternative arrangement also, advantageous effects which are similar to those offered by the foregoing embodiment are obtained.

As has been described above, according to the present invention, bent portions are provided near the open end of each positioning member in such a manner as to extend inwardly of the positioning member. Therefore, even when a large number of positioning members are stacked up, these members do not come into fiting engagement with each other, so that it is unnecessary to conduct the operation of separating the engaged positioning members before assembling. Since there is no fear of stacked positioning members coming into fitting engagement with each other, the present invention is particularly suitable for automatic feed systems.

Although the present invention has been described through specific terms, it should be noted here that the described embodiment is not necessarily exclusive and various changes and modifications may be imparted thereto without departing from the scope of the invention which is limited solely by the appended claim

What is claimed is:

1. An apparatus for securing magnetic poles of magnet-type rotating machines of the type having a cylindrical fixed frame, a plurality of permanent magnets attached to the inner side of said fixed frame at a predetermined distance in the circumferential direction, and a positioning member defined by an elastic member having a substantially U-shaped cross section, said positioning member being disposed in the space between adjacent permanent magnets in such a manner as to abut against the opposing end faces of adjacent permanent magnets to thereby effect positioning of said permanent magnets in the circumferential direction, wherein the improvement comprises, said positioning member having a bottom portion adapted for positioning at the inner side of said fixed frame and a pair of side walls extending along said bottom portion from opposite sides thereof and directed inwardly away from said fixed frame, each of said side walls having a pair of bent portions at the end edges thereof, said bent portions extending inwardly of said positioning member and spaced inwardly from said fixed frame, the bent portion at the end edge of each side wall being in substantially opposed position to the bent portion of the other side-wall.

2. An apparatus as recited in claim 1, wherein the bent portions extend in a direction from the side wall that is substantially parallel to the bottom portion.

3. An apparatus as recited in claim 1, wherein the bottom portion is substantially flat and the opposed bent portions define a gap therebetween that is smaller than the width of said bottom portion.

4. An apparatus as recited in claim 1, wherein said bent portions are formed at the upper edges of said side walls.

5. An apparatus as recited in claim 1, wherein distance between the opposing bent portions is shorter than the width of said bottom portion.

6. An apparatus as recited in claim 1, wherein the distance between the opposed pairs of bent portions is less than the width of the positioning member bottom portion.

7. An apparatus as recited in claim 6, wherein the bent portions of each pair are formed at the inner sides of the corresponding axial ends of the bottom portion of the positioning member.

* * * * *